United States Patent [19]

Penington, Jr.

[11] 4,200,161
[45] Apr. 29, 1980

[54] STAIRWAY CLIMBING DEVICE

[76] Inventor: George W. Penington, Jr., 9-D Franklin St., Charleston, S.C. 29401

[21] Appl. No.: 656,788

[22] Filed: Feb. 10, 1976

[51] Int. Cl.² ........................................... B62D 57/02
[52] U.S. Cl. ..................................... 180/8 A; 280/5.26
[58] Field of Search ...................... 280/5.2, 5.26, 5.28; 180/8 A, 8 B, 8 AB, DIG. 3; 301/40 R, 40 S, 41 R

[56] References Cited

U.S. PATENT DOCUMENTS

| 3,196,970 | 7/1965 | Brenner | 180/8 A |
|---|---|---|---|
| 3,283,839 | 11/1966 | Brown | 180/8 A |
| 3,346,268 | 10/1967 | Richman | 180/8 A X |
| 3,411,599 | 11/1968 | Kahlmorgan | 180/8 A |
| 3,580,344 | 5/1971 | Floyd | 180/8 A |

FOREIGN PATENT DOCUMENTS 1188943  4/1970  United Kingdom .................... 280/5.26

*Primary Examiner*—Joseph F. Peters, Jr.
*Assistant Examiner*—Randall A. Schrecengost

[57] ABSTRACT

A device is disclosed which is capable of moving on a stairway comprised of a plurality of steps and comprises a power source and a plurality of spoked wheels which are moveable by the power source whereby each of the plurality of spokes contacts one of the plurality of steps and moves the device along the stairway.

5 Claims, 3 Drawing Figures

STAIRWAY CLIMBING DEVICE

This invention relates to a moveable device and more particularly to a device capable of moving on a stairway comprised of a plurality of steps.

Many invalids, elderly persons, or persons suffering from one physical ailment or another have difficulty with movement in houses where they must reach another floor by use of a stairway.

The present invention solves the problem of movement up and down a stairway and is adaptable to movement not only up and down a stairway, but to movement on or over a level area.

An object of the present invention is to provide a device which can move on a stairway or over a level area.

Another object of this invention is to provide a device which can move over a level area and stairway which can be steered.

Still another object of this invention is to provide a device which contains a seat, the position of which may be controlled.

Still another object of this invention is to provide a device capable of moving on a stairway which can move in either direction perpendicular to the axles of the device.

These and other objects and features of the invention will be apparent from the following description and appended claims.

Briefly, the invention is a device capable of moving on a stairway which is comprised of a plurality of steps. The device has power means and a plurality of spoked wheels thereon. The plurality of wheels comprise a plurality of spokes which are moveable by the power means. Each of the plurality of spokes contacts one of the plurality of steps and thereby moves the device along the stairway. The device may comprise steering means secured to the plurality of spoked wheels and controlling the direction of movement of the device. Each of a plurality of round wheels may be secured to each of the plurality of spoked wheels so that the device may move smoothly over the level area. The device may further comprise a plurality of axles, a plurality of hydraulic cylinders and seat means. Each of the plurality of hydraulic cylinders is secured to one of the plurality of axles and is controlled by the power means. The seat means is secured to the plurality of hydraulic cylinders whereby the position of the seat means can be controlled by the power means. The device may further comprise a plurality of hub assemblies and a plurality of axle extensions. Each of the plurality of hub assemblies is secured to the end of one of the plurality of axles and may hold one of the plurality of spoked wheels. Each of the plurality of axle extensions is secured to one of the plurality of spoked wheels whereby one of the plurality of round wheels may be secured thereon. Control means are operative to control, through the power means, the function of driving and steering the device and the positioning of the seat means. The device further comprises directional control means operative to drive the device in either direction perpendicular to the plurality of axles. The device may have two axles with hub assemblies at the end of each axle. Four spoked wheels may be securely attached to a hub assembly. Four hydraulic cylinders may support the seat means with two of the cylinders secured to each axle.

The invention will be more fully understood from the following detailed description and appended claims when taken with the drawings in which:

Figure 1:
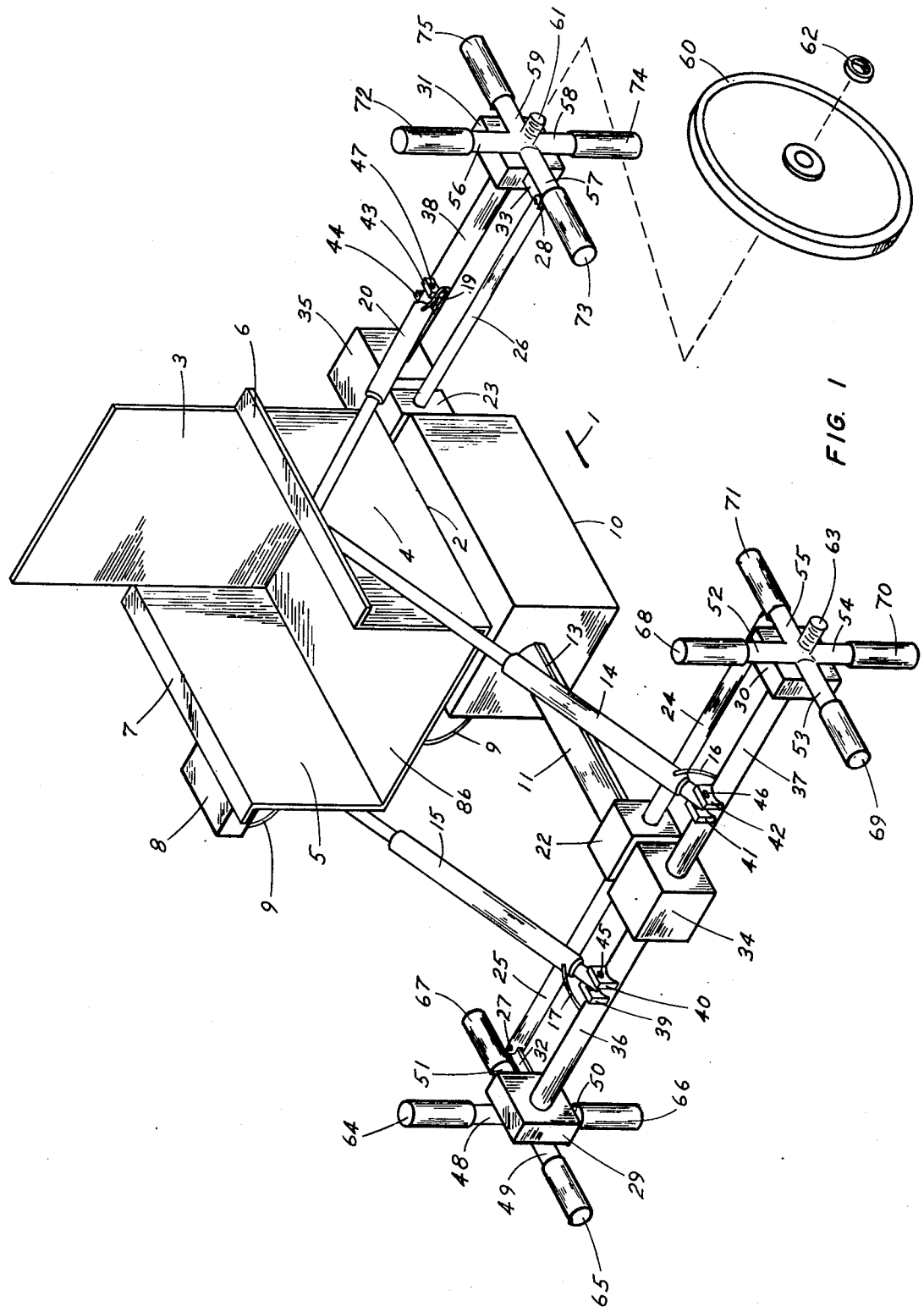
FIG. 1 is an isometric view of the device capable of moving on a stairway.

Referring now to the drawings, FIG. 1 shows an isometric view of the device capable of moving on a stairway. The device 1 is shown with seat means, or chair 2, secured thereon. The seat means 2 is comprised of chair back 3, left chair side 4, right chair side 5, and seat bottom 86. The chair also comprises left arm rest 6 and right arm rest 7. Control box 8 is secured near right arm rest 7 for convenience.

Front hydraulic cylinders 14 and 15, and rear hydraulic cylinders 20 and another rear hydraulic cylinder not shown, are secured to the chair 2. Front hydrualic cylinder 14 is connected to front left axle 37 at front left axle brackets 41 and 42 by front left pin 46. Front hydraulic cylinder 15 is connected to front right axle 36 at front right axle brackets 39 and 40 by front right pin 45.

Left rear hydraulic cylinder 20 is connected to rear left axle 38 at rear left axle brackets 43 and 44 by rear left pin 47. The right rear hydraulic cylinder which is not shown is connected to the right rear axle brackets (also not shown) by a right rear pin not shown.

The power means 10 may comprise batteries, hydraulic pumps, motors, reservoirs, switches, and any required or desired power source or accessory. Front drive shaft 11 and rear drive shaft 12 extend from and are driven by power means 10. Control box cable 9 extends from the control box 8 to the power means 10 for manual control of the functions of the device.

Front hydraulic line 13 runs from the hydraulic reservoir inside power means 10 and splits into left hydraulic line 16 and right hydraulic line 17. Left hydraulic line 16 provides the appropriate hydraulic pressure to front hydraulic cylinder 14. Right hydraulic line 17 provides the appropriate hydraulic pressure to front hydraulic cylinder 15.

Figure 2:
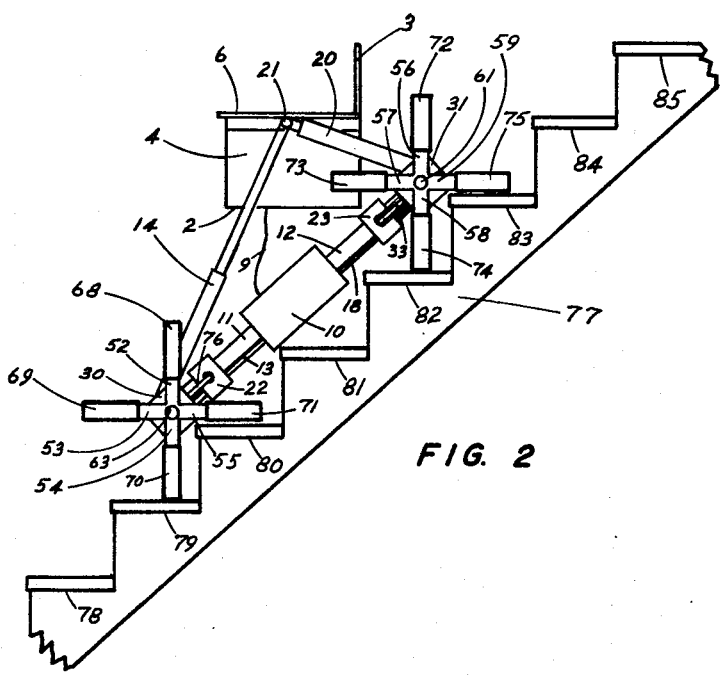
FIG. 2 is a side view of the device in FIG. 1 shown on a stairway.

FIG. 2 shows a side view of the device on a stairway. FIG. 2 shows rear hydraulic line 18 which extends from power means 10. Rear hydraulic line 18 splits into rear hydraulic line 19 which provides the appropriate hydraulic pressure to left rear hydraulic cylinder 20, and into a rear hydraulic line, not shown, which provides appropriate hydraulic pressure to the right rear hydraulic cylinder which is not shown.

Left seat connecting pin 21 secures front hydraulic cylinder 14 and left rear hydraulic cylinder 20 to the chair 2 on the left chair side 4.

A right seat connecting pin, not shown, connects front hydraulic cylinder 15 and right rear hydraulic cylinder (also not shown) to the chair 2 at the right chair side 5.

Front steering control box 22 is connected to front drive shaft 11. Front left steering control rod 24 and front right steering control rod 25 emanates from front steering control box 22.

Joint 27 connects front right steering control rod 25 to front right steering control arm 32 which enters right front hub assembly 29, which is secured to front right axle 36. Front left joint (not shown) connects front left steering control rod 24 to front left steering control arm 76 which enters left front hub assembly 30 which is secured to front left axle 37.

Rear steering control box 23 is connected to rear drive shaft 12. Rear left steering control rod 26 and rear right steering control rod (not shown) emanate from rear steering control box 23. Joint 28 connects left rear steering control rod 26 to left rear steering control arm 33 which enters left rear hub assembly 31 which is secured to rear left axle 38.

Rear right joint (not shown) connects rear right steering control rod (not shown) to rear right steering control arm (also not shown) which enters right rear hub assembly (not shown), which is secured to right rear axle (not shown).

Front differential 34 is connected to front drive shaft 11 through front steering control box 22 and drives wheels connected to hub assemblies 29 and 30. Rear differential 35 is connected to rear drive shaft 12 through rear steering control box 23 and drives wheels connected to left rear hub assembly 31 and right rear hub assembly not shown.

A plurality of spoked wheels may be secured on the device 1. A spoked wheel comprising spoke legs 48, 49, 50, and 51 is shown in FIG. 1 attached to hub assembly 29. Tips, which may be rubber or other material, may be attached to the spokes. In FIG. 1, tip 64 is attached to spoke 48. Tip 65 is attached to spoke 49. Tip 66 is attached to spoke 50 and tip 67 is attached to spoke 51.

A spoked wheel comprising spoke legs 52, 53, 54 and 55 is shown in FIG. 1 attached to hub assembly 30. Tips, which may be rubber or other material, may be attached to the spokes. In FIG. 1, tip 68 is attached to spoke 52. Tip 69 is attached to spoke 53. Tip 70 is attached to spoke 54 and tip 71 is attached to spoke 55.

A spoked wheel comprising spoke legs 56, 57, 58 and 59 is shown in FIG. 1 attached to hub assembly 31. Tips, which may be rubber or other material, may be attached to the spokes. In FIG. 1, tip 72 is attached to spoke 56. Tip 73 is attached to spoke 57. Tip 74 is attached to spoke 58 and tip 75 is attached to spoke 59. A similar spoked wheel may be attached to the right rear hub assembly which is not shown.

A plurality of round wheels may be secured to the plurality of spoked wheels which have been shown. For example, FIG. 1 shows round wheel 60 which may be secured onto axle extension 61 and secured thereon by securing nut 62. Axle extension 63 is shown on the left front of the device. Axle extensions, upon which round wheels may be placed, are on the right front and right rear spoked wheels, but are not shown in the drawings.

FIG. 2 shows a stairway 77 with steps 78, 79, 80, 81, 82, 83, 84 and 85. In FIG. 2, spoke tip 70 rests on step 79. Spoke tip 71 is about to contact step 80. Spoke tip 74 rests on step 82 and spoke tip 75 is about to contact step 83.

Figure 3:
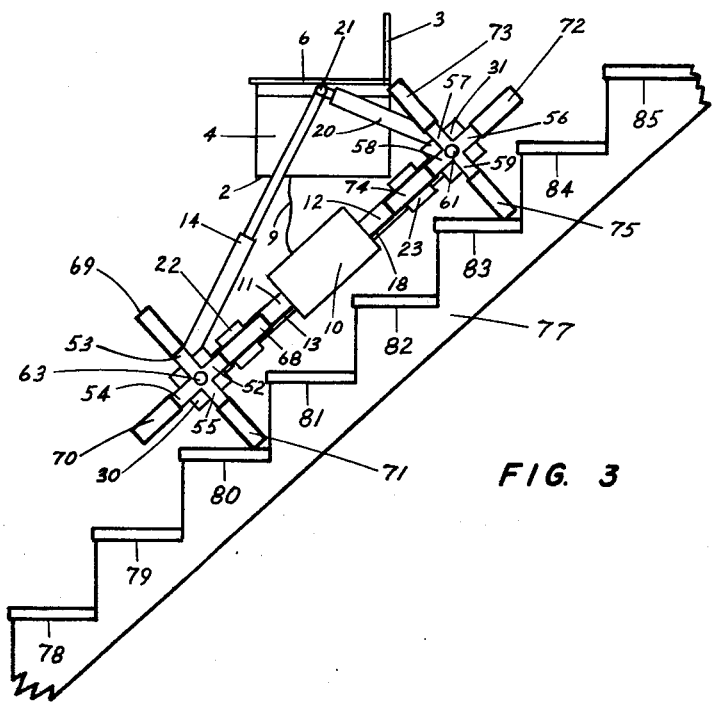
FIG. 3 is a similar view to FIG. 2 with the exception that the device is shown climbing higher on the stairway.

FIG. 3 shows a similar view to FIG. 2 except the device is climbing higher on stairway 77. Spoke tip 71 has contacted step 80 and spoke tip 75 has contacted step 83. Spoke tip 70 has been raised from step 79 and spoke tip 74 has been raised from step 82. The device is climbing up stairway 77.

The hydraulic cylinders 14, 15, 20 and one not shown can control the chair 2 to be held at a position desired by anyone who might be sitting or placed in chair 2. By use of the plurality of hydraulic cylinders, the chair can remain in a stable position even though the device 1 is climbing at an angle.

Various ways of stabilizing the position of the seat means, or chair 2, are within the scope of this invention and various methods, other than shown in the drawings, are contemplated herein.

The length of the spokes could be varied to customize the device for stairways of varying length or distance between.

The power means might be controlled by servomechanism systems or the device may be controlled simply by buttons or switches on control box 8. The control box 8 may have an on-off switch, a speed control, a directional control and various hydraulic controls for the seat means 2. The spoked legs may have rubber tips, or any other material tips for better wear, holding ability or any other desired function or purpose.

The device may be driven in either of two directions perpendicular to the axles. The front drive shaft 11 and rear drive shaft 12 are synchronized to increase the power and efficiency of the device 1. The device 1 may take the person in the chair either up or down the stairway. With a simple attachment of the plurality of round wheels, such as round wheel 60, the device 1 may be adapted for smooth travel over a level area. A person may then use the device not only for movement up and down a stairway, but for any desired movement.

The device is applicable as a wheelchair which can climb stairways or may be simply applicable as a carrying device for various materials which may be required to be moved up and down stairways.

Invalids, elderly persons or persons suffereing from one physical ailment or another will be able to have easier movement where they must reach another level by use of a stairway. A plurality of whels, such as round wheel 60, may be attached by the method shown, or may be secured in any other manner which might be more convenient to the person. It is contemplated that round wheel 60 will be at least as large in diameter so that the tips of the spoked wheels do not extend outside the round wheel.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A device capable of moving on a stairway comprised of a plurality of steps comprising:
   (a) power means secured on said device;
   (b) a plurality of front and rear spoked wheels secured on said device, said plurality of spoked wheels comprising a plurality of spokes being movable by said power means; each of said plurality of spokes being spaced apart, extending from a center section, and comprising a rigid end section which contacts one of said plurality of steps while said device is moving, each end section comprising a spoke tip which is a rigid piece axially aligned with each of said plurality of spokes and mounted at the distal end from the hub on each of said plurality of spokes; said plurality of spoked wheels further comprising a plurality of axle extensions, each secured to and extending outward from one of said center sections of the wheel; said power means providing power to said center section to provide movement for each of said plurality of spokes;

(c) a plurality of round wheels each of which may be secured to one of said plurality of spoked wheels whereby said device may smoothly move over a level area and each of said plurality of round wheels may be secured on each of said plurality of axle extensions whereby each of said plurality of spokes contacts one of said plurality of steps when said device is moving along said stairway.

2. A device capable of moving on a stairway comprised of a plurality of steps comprising:
(a) power means secured on said device;
(b) a plurality of front and rear spoked wheels secured on said device, said plurality of spoked wheels comprising a plurality of spokes being movable by said power means; each of said plurality of spokes being spaced apart, extending from a center section, and comprising a rigid end section which contacts one of said plurality of steps while said device is moving, each end section comprising a spoke tip which is a rigid piece axially aligned with each of said plurality of spokes and mounted at the distal end from the hub on each of said plurality of spokes; said plurality of spoked wheels further comprising a plurality of axle extensions, each secured to and extending outward from one of said center sections of wheel; said power means providing power to said center section to provide movement for each of said plurality of spokes;
(c) a plurality of round wheels each of which may be secured to one of said plurality of spoked wheels whereby said device may smoothly move over a level area and each of said plurality of round wheels may be secured on each of said plurality of axle extensions;
(d) steering means secured to said plurality of spoked wheels and controlling the direction of movement of said device
whereby each of said plurality of spokes contacts one of said plurality of steps when said device is moving along said stairway.

3. A device according to claim 2 further comprising:
(a) a plurality of axles;
(b) a plurality of hydraulic cylinders each secured to one of said plurality of axles and controlled by said power means; and
(c) seat means secured to said plurality of hydraulic cylinders whereby the position of said seat means can be controlled by said power means.

4. A device according to claim 3 further comprising a plurality of hub assemblies each secured to the end of one of said plurality of axles, and capable of holding one of said plurality of spoked wheels.

5. A device capable of moving on a stairway comprised of a plurality of steps comprising:
(a) power means secured on said device;
(b) a plurality of front and rear spoked wheels secured on said device, said plurality of spoked wheels comprising a plurality of spokes being movable by said power means; each of said plurality of spokes being spaced apart, extending from a center section, and comprising a rigid end section which contacts one of said plurality of steps while said device is moving, each end section comprising a spoke tip which is a rigid piece axially aligned with each of said plurality of spokes and mounted at the distal end from the hub on each of said plurality of spokes; said plurality of spoked wheels further comprising a plurality of axle extensions, each secured to and extending outward from one of said center sections of wheel; said power means providing power to said center section to provide movement for each of said plurality of spokes;
(c) steering means secured to said plurlaity of spoked wheels and controlling the direction of movement of said device;
(d) a plurality of axles;
(e) a plurality of hydraulic cylinders each secured to one of said plurality of axles and controlled by said power means;
(f) seat means secured to said plurality of hydraulic cylinders whereby the position of said seat means can be controlled by said power means;
(g) control means operative to control, through said power means, the functions of driving and steering said device and the positioning of said seat means;
(h) directional control means operative to drive said device in either direction perpendicular to said plurality of axles;
(i) said device has two axles with hub assemblies at the end of each axle, four spoked wheels, each of said spoked wheels attached to a hub assembly, four hydraulic cylinders supporting said seat means with two of said four hydraulic cylinders secured to each axle
whereby each of said plurality of spokes contacts one of said plurality of steps when said device is moving along said stairway.

* * * * *